(12) United States Patent
Adam

(10) Patent No.: US 10,104,450 B2
(45) Date of Patent: Oct. 16, 2018

(54) METHOD AND DEVICE FOR CONTROLLING IMPLEMENTATION OF APPLICATION AND RECORDING MEDIUM THEREOF

(71) Applicant: SAMSUNG ELECTRONICS CO., LTD., Suwon-si (KR)

(72) Inventor: John Adam, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/885,441

(22) Filed: Oct. 16, 2015

(65) Prior Publication Data

US 2016/0112769 A1 Apr. 21, 2016

(30) Foreign Application Priority Data

Oct. 17, 2014 (GB) .................................. 1418414.7
Jul. 6, 2015 (KR) ........................ 10-2015-0095854

(51) Int. Cl.
| | |
|---|---|
| *H04N 5/445* | (2011.01) |
| *H04N 21/81* | (2011.01) |
| *H04N 21/434* | (2011.01) |
| *H04N 21/458* | (2011.01) |
| *H04N 21/4722* | (2011.01) |
| *H04N 21/431* | (2011.01) |
| *H04N 21/435* | (2011.01) |

(Continued)

(52) U.S. Cl.
CPC ....... *H04N 21/8173* (2013.01); *H04N 21/431* (2013.01); *H04N 21/435* (2013.01); *H04N 21/4345* (2013.01); *H04N 21/44008* (2013.01); *H04N 21/44218* (2013.01); *H04N 21/4586* (2013.01); *H04N 21/478* (2013.01); *H04N 21/4722* (2013.01); *H04N 21/84* (2013.01); *H04N 21/2362* (2013.01)

(58) Field of Classification Search
CPC .................................................. H04N 21/2362
USPC .......................................................... 725/48
See application file for complete search history.

(56) References Cited

U.S. PATENT DOCUMENTS

| | | | |
|---|---|---|---|
| 2008/0209453 A1 | 8/2008 | Wouters | |
| 2011/0093895 A1* | 4/2011 | Lee .................... | H04N 21/4432 725/40 |

(Continued)

FOREIGN PATENT DOCUMENTS

| | | | | |
|---|---|---|---|---|
| EP | 1940057 A2 | 7/2008 | | |
| EP | 2252055 A1 * | 11/2010 | ......... | H04N 7/17318 |

(Continued)

OTHER PUBLICATIONS

Communication dated Jan. 8, 2016 by the European Patent Office in counterpart European Application No. 15190234.3.

(Continued)

*Primary Examiner* — Michael Hong
(74) *Attorney, Agent, or Firm* — Sughrue Mion, PLLC

(57) ABSTRACT

A method of controlling implementation of an application in a device includes obtaining identification information of one or more applications to perform rendering of media data in the device, displaying the obtained identification information on a screen of the device, and executing one application according to receipt, from a user, of an execution request of the application from among the one or more applications.

20 Claims, 13 Drawing Sheets

(51) Int. Cl.
*H04N 21/44* (2011.01)
*H04N 21/442* (2011.01)
*H04N 21/478* (2011.01)
*H04N 21/84* (2011.01)
*H04N 21/2362* (2011.01)

(56) References Cited

U.S. PATENT DOCUMENTS

| | | |
|---|---|---|
| 2012/0295661 A1 | 11/2012 | Kim et al. |
| 2013/0205323 A1 | 8/2013 | Sinha et al. |
| 2014/0130092 A1* | 5/2014 | Kunisetty .......... H04N 21/4828 725/40 |
| 2015/0074728 A1* | 3/2015 | Chai ................ H04N 21/482 725/61 |
| 2015/0100982 A1* | 4/2015 | Sirpal ............... H04N 21/4126 725/37 |

FOREIGN PATENT DOCUMENTS

| | | | |
|---|---|---|---|
| EP | 2706734 A1 | 3/2014 | |
| EP | 2782349 * | 9/2014 | ......... H04N 21/4181 |
| EP | 2782349 A1 * | 9/2014 | ......... H04N 21/4181 |
| GB | 2492443 A | 1/2013 | |
| GB | 2494748 A | 3/2013 | |
| GB | 2500771 A | 10/2013 | |
| KR | 10-0619310 B1 | 9/2006 | |
| WO | 2012064317 A1 | 5/2012 | |
| WO | 2012169834 A2 | 12/2012 | |

OTHER PUBLICATIONS

Communication dated Feb. 16, 2016 by the European Patent Office in counterpart European Application No. 15190234.3.

Communication dated Apr. 8, 2015, issued by the Intellectual Property Office of Great Britain in counterpart British Application No. GB1418414.7.

* cited by examiner

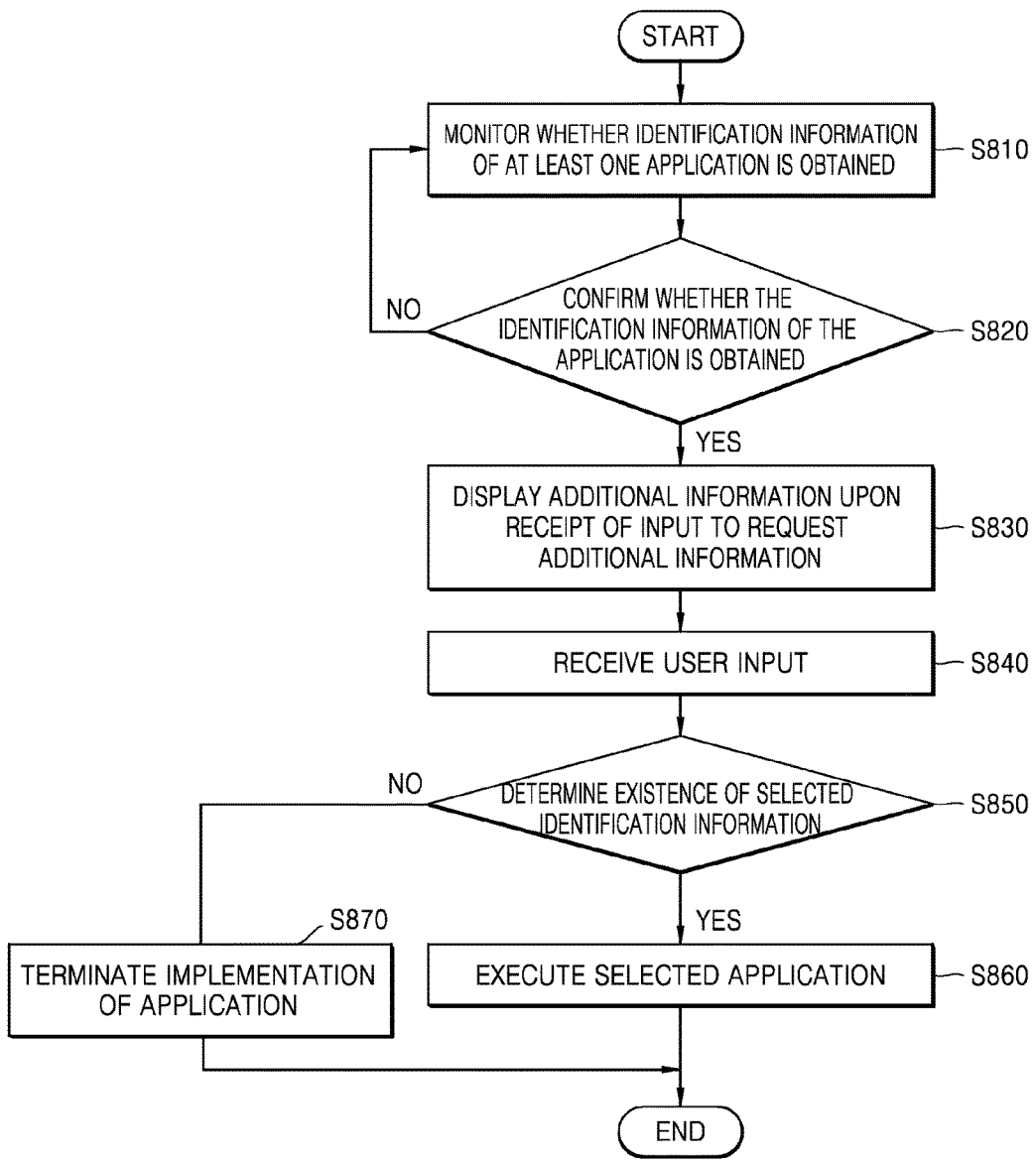

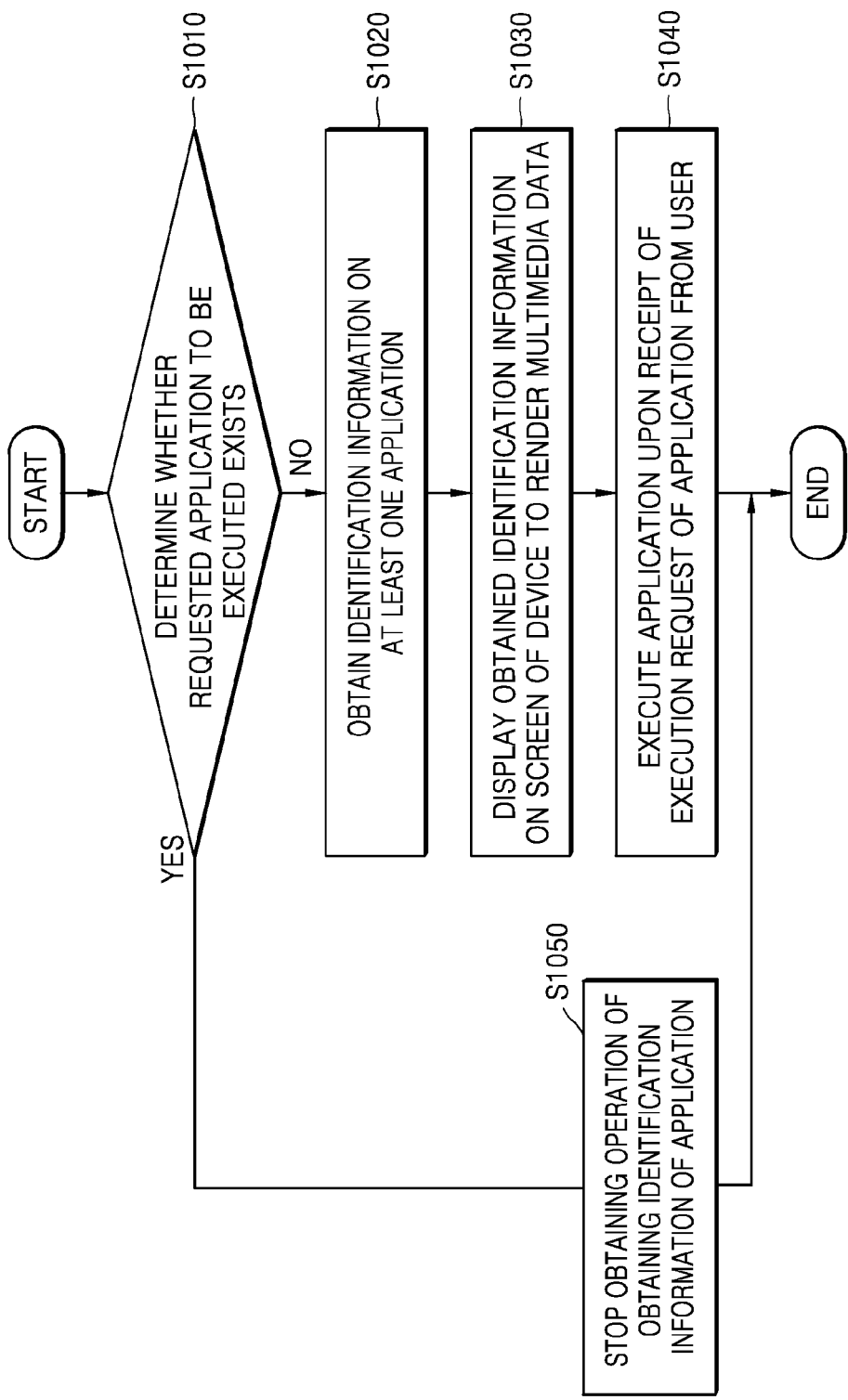

METHOD AND DEVICE FOR CONTROLLING IMPLEMENTATION OF APPLICATION AND RECORDING MEDIUM THEREOF

CROSS-REFERENCE TO RELATED APPLICATIONS

This application claims the benefit of British Patent Application No. 1418414.7, filed on Oct. 17, 2014, in the UK Intellectual Property Office and Korean Patent Application No. 10-2015-0095854, filed on Jul. 6, 2015, in the Korean Intellectual Property Office, the disclosures of which are incorporated herein in their entireties by reference.

BACKGROUND

1. Field

The present disclosure relates to methods and apparatuses for controlling implementation of an application in a device, and a non-transitory computer-readable recording medium having recorded thereon computer-readable codes for executing the method of controlling the implementation of the application in the device.

2. Description of the Related Art

Recently, digital broadcasting receivers are becoming more elaborate by facilitating new characteristics of providing a user with mutually exchangeable viewing experiences. Digital broadcasting standards have been developed to facilitate automatic execution of an application provided by a broadcasting company to the digital broadcasting receivers when the user changes one video stream to another video stream from among a plurality of video streams to be reproduced in the digital broadcasting receivers. However, the digital broadcasting receivers are generally developed to execute a single application at a time. Accordingly, a collision occurs when two applications are simultaneously executed in the digital broadcasting receiver. In order to solve this collision problem between applications, a method has been developed of assigning a priority to an application by providing a preference to the application associated with a current broadcasting channel.

SUMMARY

Provided are methods and apparatuses for controlling implementation of an application in a device.

Provided is a non-transitory computer-readable recording medium having recorded thereon computer-readable codes as a program for executing a method of controlling implementation of an application in a device.

Additional aspects will be set forth in part in the description which follows and, in part, will be apparent from the description, or may be learned by practice of the presented exemplary embodiments.

According to an aspect of an exemplary embodiment, a method of controlling implementation of an application in a device, the method including obtaining identification information on one or more applications to perform rendering media data in the device, displaying the obtained identification information on a screen of the device, and executing one application according to receipt of an execution request of the application among the one or more applications from a user.

According to an aspect of an exemplary embodiment, the method may further include receiving an input from the user to request additional information on a selected application among the one or more applications, and displaying the additional information on the selected application.

According to an aspect of an exemplary embodiment, the executing of the application may include executing the application corresponding to the identification information selected by the user among the identification information on a plurality of applications displayed on the screen of the device.

According to an aspect of an exemplary embodiment, the obtaining of the identification information may include extracting the identification information from one or more data streams including the media data.

According to an aspect of an exemplary embodiment, the obtaining of the identification information may include extracting the identification information from a program map table (PMT) or an application information table (AIT) which is included in the one or more data streams.

According to an aspect of an exemplary embodiment, the one or more data streams may include data streams each conforming to a corresponding one of broadcasting standards which are different from each other.

According to an aspect of an exemplary embodiment, the method may further include monitoring whether the identification information on the one or more applications are obtained.

According to an aspect of an exemplary embodiment, the executing of the application may include detecting a gesture of the user, and executing the application when the detected gesture of the user corresponds to a preset gesture to determine whether the execution of the application is approved.

According to an aspect of an exemplary embodiment, the obtaining of the identification information may include obtaining the identification information of the one or more applications when receiving a request to change a channel through which the media data is received.

According to an aspect of an exemplary embodiment, a device to control implementation of an application may include an identification information obtaining unit to obtain identification information on one or more applications to perform rendering media data, a display unit to display the obtained identification information on a screen of the display unit, and a control unit to execute one application according to receipt of an execution request of the application among the one or more applications from a user.

According to an aspect of an exemplary embodiment, the device may further include an input apparatus to receive an input from the user to request additional information on a selected application among the one or more applications, and to obtain the requested additional information. The display unit may display the obtained additional information of the selected application.

According to an aspect of an exemplary embodiment, the control unit may execute the application corresponding to the identification information selected by the user among the identification information on a plurality of applications displayed on the screen of the display unit.

According to an aspect of an exemplary embodiment, the identification information obtaining unit may extract the identification information from one or more data streams including the media data.

According to an aspect of an exemplary embodiment, the identification information obtaining unit may extract the identification information from a program map table (PMT) or an application information table (AIT) which is included in the one or more data streams.

According to an aspect of an exemplary embodiment, the one or more data streams may include data streams each conforming to a corresponding one of broadcasting standards which are different from each other.

According to an aspect of an exemplary embodiment, the identification information obtaining unit may monitor whether the identification information on the one or more applications are obtained.

According to an aspect of an exemplary embodiment, the control unit may detect a gesture of the user and executes the application when the detected gesture of the user corresponds to a preset gesture to determine whether the execution of the application is approved.

According to an aspect of an exemplary embodiment, the identification information obtaining unit may obtain the identification information of the one or more applications when receiving a request to change a channel through which the media data is received.

According to an aspect of an exemplary embodiment, a computer-readable storage medium may contain computer-readable codes as a program to execute the method described above or hereinafter.

BRIEF DESCRIPTION OF THE DRAWINGS

These and/or other aspects will become apparent and more readily appreciated from the following description of the exemplary embodiments, taken in conjunction with the accompanying drawings in which:

FIG. 8 is a flowchart illustrating a method of presenting additional information about an application in a device, according to an exemplary embodiment of the present inventive concept;

FIG. 10 is a flowchart illustrating a method of controlling an operation of monitoring identification information of another application when an application is executed in a device, according to an exemplary embodiment of the present inventive concept;

DETAILED DESCRIPTION

Figure 1:
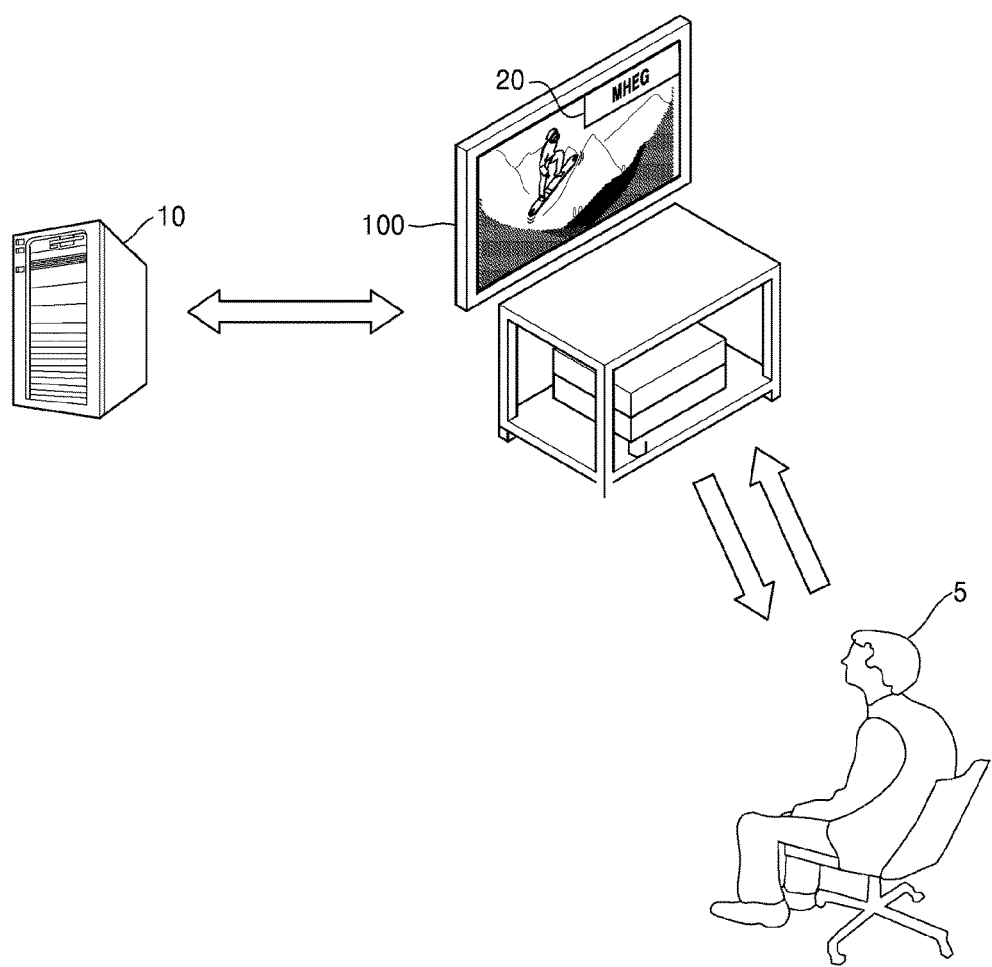
FIG. 1 is a conceptual diagram illustrating a device for controlling implementation of an application, according to an exemplary embodiment of the present inventive concept.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

In the present disclosure, it will be understood that when the term "connected" is used to specify a connection of one portion to other portion, the term "connected" includes "directly connected" and also includes "electrically connected through an intermediate element" between the one portion and the other portion. Also, it will be further understood that the terms "comprises" and/or "comprising" used herein specify the presence of stated features or components, but do not preclude the presence or addition of one or more other features or components unless the present disclosure describes otherwise.

As used herein, the term "and/or" includes any and all combinations of one or more of the associated listed items. Expressions such as "at least one of," when preceding a list of elements, modify the entire list of elements and do not modify the individual elements of the list.

Hereinafter, the present inventive concept will be explained with reference to the drawings in detail.

FIG. 1 is a conceptual diagram illustrating a device 100 to control implementation of an application according to an embodiment of the present inventive concept.

According to the embodiment of the present inventive concept, the device 100 may receive a data stream including media data from a server 10. Here, the data stream may conform to one of a plurality of digital video broadcasting standards. Also, the device 100 may receive a plurality of data streams conforming to different digital video broadcasting standards.

The device 100 may perform rendering the media data by detecting the media data from the received data stream. The media data may include multimedia data and hypermedia data.

Meanwhile, the device 100 may store at least one application to perform the rendering of the media data. Here, the application may be determined according to a standardization method of the medial data on which the rendering is performed by the application.

The device 100 may detect identification information on the application from the data stream including the media data. For example, the device 100 may detect the identification information on the application from a program management table (PTM) or an application information table (AIT) included in the data stream. Here, the identification information may include an identifier representing the application.

For example, the identification information representing a multimedia and hypermedia information coding experts group (MHEG) application may be detected from the PMT included in the data stream. The MHEG application may perform the rendering of the media data according to a format, a synchronizing method, and a multiplexing method which are predetermined by the MHEG.

In another example, the identification information representing a multimedia home platform (MHP) application may be detected from the AIT which is included in the data stream. The MHP application may perform the rendering of the media data according to a format, a synchronizing method, and a multiplexing method which are predetermined by the MHP.

In another example, the identification information representing a hybrid broadcast broadband TV (HbbTV) application may be detected from the AIT which is included in the data stream. The HbbTV application may perform the rendering of the media data according to a format, a synchronizing method, and a multiplexing method which are predetermined by the HbbTV.

Meanwhile, the device 100 may receive an execution command, which requests execution of the application relating to the media data, from an external server through a module or interface which operates in the device 100.

For example, the execution command, which requests execution of a common interface plus official web site (CI Plus) application, may be received through a CI Plus official web site conditional access module (CI Plus CAM) which operates in the device 100. The CI Plus application may perform the rendering of the media data according to a method which is predetermined by the CI Plus.

The device 100 outputs a message 20, for example, to confirm the execution of the application from a user 5 before executing the application. Here, the message 20 may be an image, text, or voice. For example, the device 100 may display an image as the message 20 including a name of the MHEG application on a side of a screen of the device 200 to confirm the execution of the MHEG application.

The message 20 to confirm whether to execute the application may be displayed for a period of time which may be determined according to a preference of the user 5. For example, the device 100 may display the message 20 to confirm whether to execute the application on the side of the screen for 5 seconds and thereafter remove the message 20 from the screen of the device 100. When the user 5 requests the execution of the application, the device 100 may display the message 20 to confirm the execution of the application on the screen of the device 100 again.

The user 5 may determine the execution of the application by confirming the message 20 output from the device 100. For example, when the device 100 receives an execution request to approve the execution of the application from the user 5, the device 100 may perform the execution of the application. The user 5 may transmit the execution request of the application to the device 100 using various input apparatuses, such as a remote controller and a smart phone. In another example, when the device 100 includes a sensor to recognize a touch input or a hovering input of the user 5, the user may transmit the execution request of the application to the device 100 by using the touch input or the hovering input. In another example, the user 5 may transmit the execution request of the application using a gesture or voice.

Figure 2:
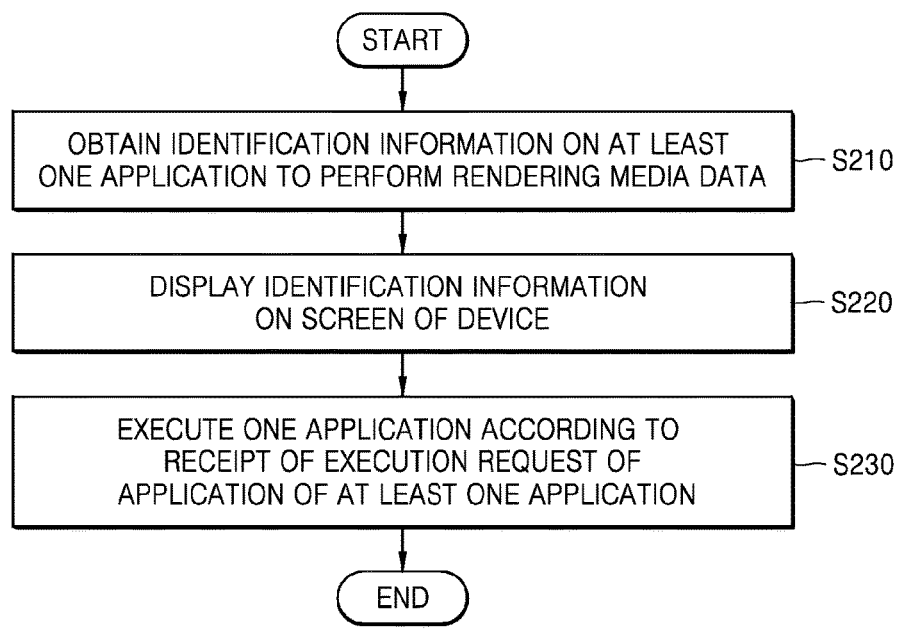
FIG. 2 is a flowchart illustrating a method of controlling implementation of an application in a device, according to an exemplary embodiment of the present inventive concept.

FIG. 2 is a flowchart illustrating a method of controlling implementation of an application in the device 100 according to an embodiment of the present inventive concept.

In operation S210, the device 100 obtains identification information on at least one application to perform rendering media data. Hereinafter, the device 100 is illustrated to generate a trigger event when the device 100 obtains the identification information on the at least one application to perform the rendering of the media data.

According to one embodiment of the present inventive concept, the device 100 may monitor whether the trigger event is generated. For example, when the user 5 changes a channel which transmits a data stream to the device 100, the trigger event may be generated by receiving a new data stream according to the channel change.

In another example, the device 100 may receive the execution command to execute the application from the external server or other device though the module or interface included in the device 100. Here, the execution command may include the identification information on the application. The receiving of the execution command to execute the application from the external server or other device though the module or interface included in the device 100 may be the trigger event.

In operation S220, the device 100 may display the identification information on the screen of the device 100. The identification information on the application may be displayed as an image or text. For example, the device 100 may display the identification information on the side of the screen using a color of a currently displayed image and a color distinguishable from the color of the currently displayed image.

However, the above display method is just an illustration of the one embodiment. The device 100 may output voice data as the identification information.

In operation S230, the device 100 may execute one application according to the receipt of the execution request of the application of the at least one application. When the device 100 obtains the identification information of the application, the device 100 may receive an input to determine the execution of the application from the user 5. For example, the device 100 may receive the execution request to approve the execution of the application from the user 5. According to an embodiment of the present inventive concept, the device 100 may execute the application by controlling middleware associated with the application when receiving the execution request of the application.

Meanwhile, when the device 100 receives the execution request of the user 5 to approve the execution of the application, the device 100 may stop monitoring the trigger event until the execution of the application is completed. If the device 100 continuously obtains the identification information of the application from the data stream, and if the device 100 requests the execution of the application, which has been already approved, to the user 5 again, it is inconvenient for the user 5 to use the media data.

The device 100 may restart monitoring whether the identification information on the application is obtained, after the approved execution of the application is completed.

Figure 3:
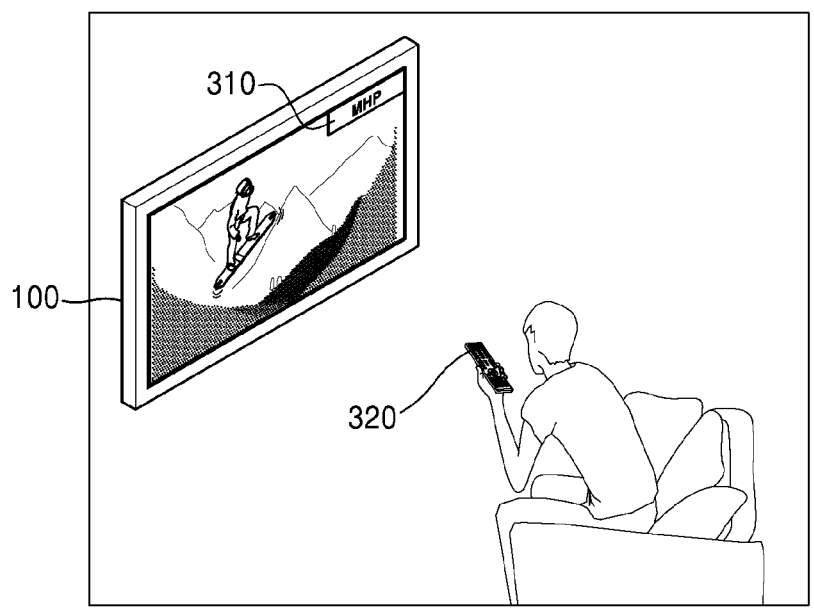
FIG. 3 is a view illustrating a method of determining execution of an application according to a user input in a device, according to an exemplary embodiment of the present inventive concept.

FIG. 3 is a view illustrating a method of determining execution of an application according to a user input in the device 100 according to an embodiment of the present inventive concept.

Referring to FIG. 3, when a user changes a channel, the device 100 may obtain identification information on the application to perform rendering media data from a data stream provided from the changed channel. For example, the device 100 may obtain the identification information on an MHP application from an AIP included in the data stream.

The device 100 may display a message 310 on a screen of the device 100 to confirm whether to execute the MHP application. For example, the device 100 may display an image as the message 310 on an upper side of the screen of the device 100 to confirm the execution of the MHEP application. The image displayed on the screen may include a name or an icon of the MHEG.

The user may request the execution of the MHP application to the device 100 by using an input apparatus 320 which is able to communicate with the device 100. For example, when the user selects a confirmation button of the input apparatus 320 which may be a remote controller, the remote controller may transmit an execution request to the device 100. However, this is just an exemplary embodiment. The input apparatus 320 may be a smart phone or a tablet which is able to communicate with a TV corresponding to the device 100. The input apparatus will be described with reference to FIG. 4 in detail later.

Upon receiving the execution request from the user, the device 100 may execute the MHP application. For example, the device 100 may execute the MHP application by controlling middleware which is pre-stored in the device 100.

Figure 4:
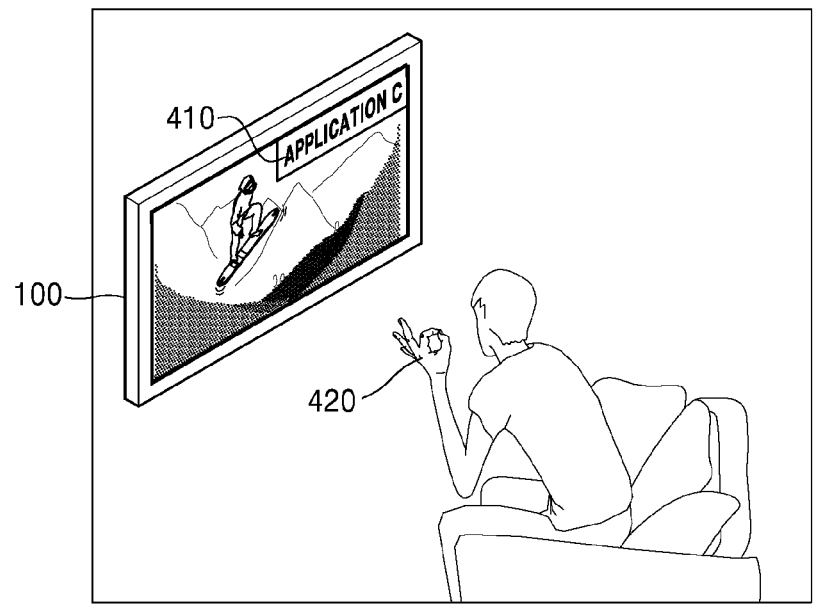
FIG. 4 is a view illustrating a method of determining execution of an application according to a user gesture in a device, according to an exemplary embodiment of the present inventive concept.

FIG. 4 is a view illustrating a method of determining execution of an application according to a user gesture in the device 100 according to an embodiment of the present inventive concept.

Referring to FIG. 4, when a user changes a channel, the device 100 may obtain identification information on the application to perform rendering media data of a data stream provided from the changed channel. For example, the device may obtain the identification information on an MHP application from an AIP included in the data stream.

The device 100 may display a message 410 on a screen of the device 100 to confirm the execution of the MHP application. For example, the device 100 may display an image as the message 410 on an upper side of the screen to confirm the execution of the MHEG application. The displayed image may include a name or an icon of the MHEG application.

The user may request the execution of the MHP application to the device 100 by making a gesture 420 which is preset in the device 100. For example, when the user makes the gesture 420 with one hand of an okay form within a distance in which the device 100 may detect the gesture 420, the device 100 may recognize the gesture 420 as the execution request of the MHP application from the user. However, this is just an exemplary embodiment. A type of a gesture may be determined by the user who presets the gesture in the device 200.

Figure 5:
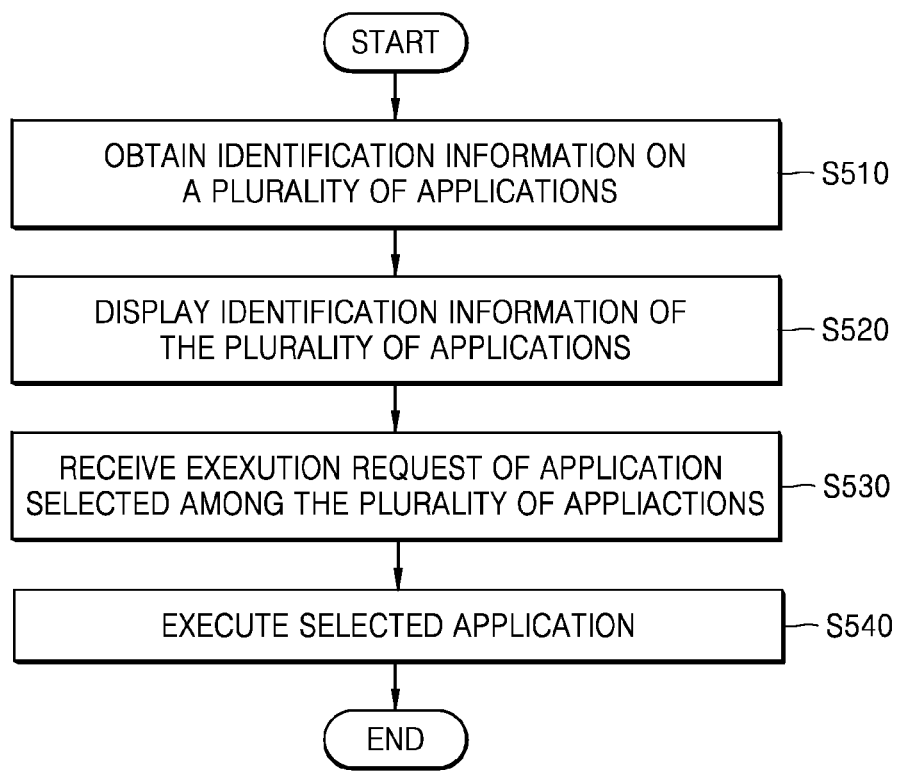
FIG. 5 is a flowchart illustrating a method of controlling implementation of a plurality of applications when a device obtains identification information of the plurality of applications, according to an exemplary embodiment of the present inventive concept.

FIG. 5 is a flowchart illustrating a method of controlling implementation of a plurality of applications when the device 100 obtains identification information on the plurality of applications according to an embodiment of the present inventive concept.

In operation S510, the device 100 may obtain the identification information on the plurality of applications which are executable in the device 100.

According to one embodiment of the present inventive concept, the device 100 may monitor whether a trigger event is generated.

The device 100 may obtain the identification information of the plurality of applications when the identification information of the plurality of applications are included in at least one data stream which is received from a server or other device.

In another example, the device 100 may receive an execution command to request the execution of the application corresponding to the media data from an external server or other device through a module or an interface which operates in the device 100. The received execution command may include the identification information on the plurality of applications.

Meanwhile, the operation S510 of FIG. 5 may correspond to the operation S210 of FIG. 2.

In operation S520, the device 100 may display the identification information of the plurality of applications on a screen of the device 100. The identification information of the plurality of applications may be displayed as a distinguishable image or text form on the screen of the device 100. The device 100 may determine at least one of a color and a size of the identification information which is displayed on the screen of the device 100 according to the color or size of the media data to be rendered.

In operation S530, the device 100 may select one application among the plurality of applications according to a user selection input.

For example, the user may select at least one among images representing the respective applications, which are displayed on the screen of the device 100, by using an arrow button of an input apparatus. In another example, the user may select at least one among the identification information of the plurality of applications by using a gesture or voice.

According to one embodiment of the present inventive concept, the device 100 may display additional information about the respective applications on the screen of the device 100 according to a user request before the user selects one of the applications. The additional information may include at least one of an identifier of the application, a title of the application, a source server providing the application to the user, and a channel corresponding to the application to be executed. However, the above-described additional information is just an exemplary embodiment, and the present inventive concept is not limited thereto. The additional information will be described with reference to FIG. 8 in detail later.

Meanwhile, the user selection input which the device 100 receives from the user may include the execution request to execute the selected application. However, the user selection input is just an exemplary embodiment. The device 100 may receive the execution request to execute the application separately from the user selection input. When the execution request is received by the device 100 separately from the user selection input, the device 100 may display a message on the screen of the device 100 to confirm the execution of the selected application.

In operation S540, the device 100 may execute the selected application.

According to one embodiment of the present inventive concept, when at least one of the plurality of applications is selected, the device 100 may execute the selected application by controlling the middle ware associated with the selected application.

Meanwhile, when the device 100 receives the execution request from the user to approve the execution of the application, the device 100 may stop monitoring the trigger event until the execution of the application is completed. If the device 100 continuously obtains the identification information of the application from the data stream, and if the device 100 re-requests the user about the execution of the application which has been already approved by the user, it may cause inconvenience to the user in using the media data.

Figure 6:
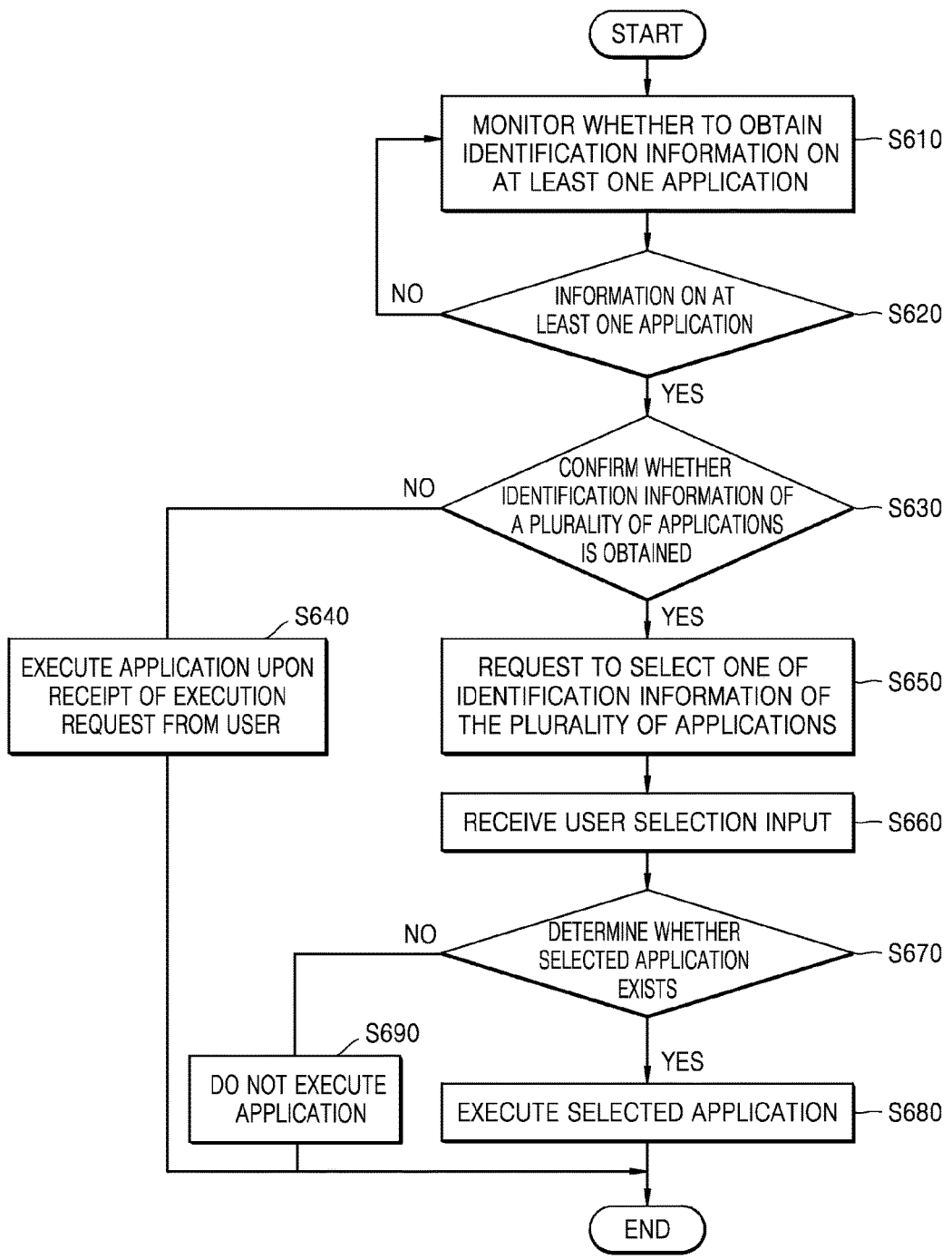
FIG. 6 is a flowchart illustrating a method of controlling implementation of a plurality of applications when a device obtains identification information of the plurality of applications, according to an exemplary embodiment of the present inventive concept.

FIG. 6 is a flowchart illustrating a method of controlling implementation of a plurality of applications when the device 100 obtains identification information on the plurality of applications according to an embodiment of the present inventive concept.

In operation 610, the device 100 may monitor whether to obtain the identification information on at least one application.

According to one embodiment of the present inventive concept, when a channel is changed, the device 100 may obtain the identification information on at least one application. According to another embodiment, the device 100 may receive the execution command and identification information of the application associated with the media data from an external server or other device through a module or interface of the device 100.

Meanwhile, the operation S610 of FIG. 6 corresponds to the operation S210 of FIG. 2.

In operation S620, the device 100 may confirm whether the identification information of one application is obtained. The device 100 may perform the monitoring as previously described in the operation S610 when the identification information of the one application is not obtained.

In operation S630, the device 100 may confirm whether the identification information of the plurality of applications is obtained. For example, the device 100 may confirm whether the identification information of the plurality of applications is included in at least one obtained data stream.

In operation S640, when the device 100 obtains the identification information of the application, the device 100 may execute the application corresponding to the received identification information according to the execution request received from the user. The device 100 may display on the screen a message to receive a user approval on the execution of the application corresponding to the obtained identification information when the device 100 obtains the identification information of the application. The device 100 may execute the one application corresponding to the obtained identification information when receiving the execution request from the user in response to the message.

Meanwhile, the device 100 may not execute the application corresponding to the obtained identification information when the device does not receive the execution request from the user or when the device 100 receives a user request to refuse the execution of the application.

In operation S650, the device 100 may request the user to select one of the identification information of the plurality of applications. For example, the device 100 may display the identification information of the plurality of applications on the screen of the device 100 to request the user to select one application among the plurality of applications.

In operation S660, the device 100 may receive the user selection input to select the identification information on at least one application.

Meanwhile, the operation S660 of FIG. 6 may correspond to the operation S530 of FIG. 5.

In operation S670, the device 100 may determine whether there exists the application corresponding to the at least one selected identification information. The device 100 may confirm whether there exists identification information to correspond to the identification information of the selected application among the identification information of the plurality of applications stored in a memory unit of the device 100.

In operation S680, the device 100 may execute the application corresponding to the selected identification information. According to one embodiment of the present inventive concept, the device 100 may execute the application by controlling the middleware associated with the application corresponding to the selected identification information.

In operation S690, the device 100 may terminate the implementation of the application when the selected identification information does not exist.

Figure 7:
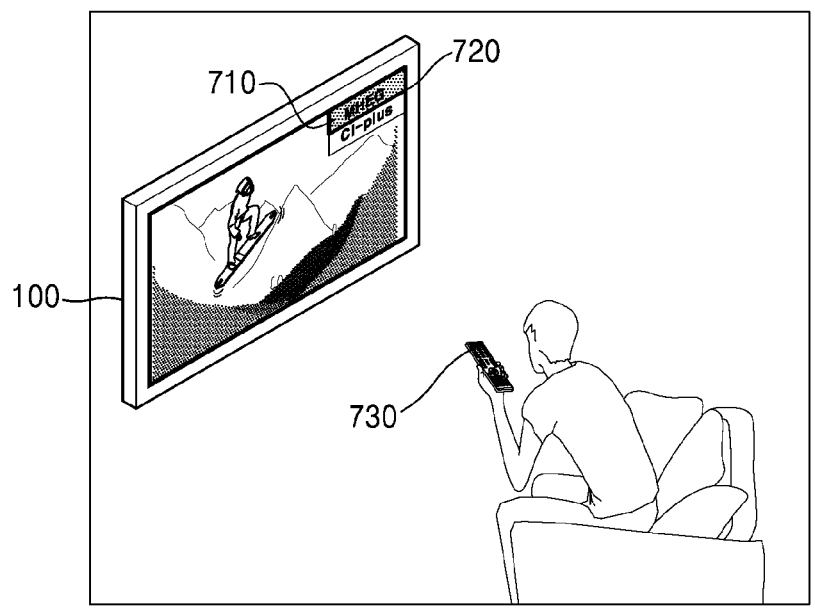
FIG. 7 is a view illustrating a method of controlling implementation of a plurality of applications when a device obtains identification information of the plurality of applications, according to an exemplary embodiment of the present inventive concept.

FIG. 7 is a view illustrating a method of controlling implementation of a plurality of applications when the device 100 obtains identification information on the plurality of applications according to an embodiment of the present inventive concept.

The device 100 may detect at least one of identification information from a received data stream when a channel is changed by a user. For example, the device 100 may detect (or extract) the identification information representing at least one application from a PMT or an AIT included in the data stream.

Meanwhile, according to another embodiment, the device 100 may receive the identification information of the application relating to media data separately from the data stream including the media data. For example, the device 100 may receive an execution command including the identification information of the CI Plus application through the CI Plus CAM which operates in the device 100.

Referring to FIG. 7, the device 100 may display images 710 and 720 corresponding to an MHEG application and a CI Plus application, respectively, to be distinguished from each other on a screen of the device 100. The displayed images 710 and 720 may include names to represent the MHEG application and the CI Plus application.

A user may select one application between the MHEG application and the CI Plus application by using an input apparatus 730 which is able to communicate with the device 100. For example, the user may select one of the MHEG application and the CI Plus application by pressing an arrow button of a remote controller as the input apparatus 730. However, the above-described remote controller is just an exemplary embodiment. The input apparatus 730 may be a smart phone or tablet, which is able to communicate with a TV as the device 100. In another embodiment, the user may select one of the plurality of applications by using a gesture or voice.

FIG. 8 is a flowchart illustrating a method of presenting additional information on an application in the device 100 according to an embodiment of the present inventive concept.

In operation S810, the device 100 may monitor whether identification information of at least one application is obtained.

According to an embodiment of the present inventive concept, when a channel is changed, the device 100 may obtain the identification information of the at least one application. According to another embodiment, the device 100 may receive an execution command of the application associated to media data from an external server or other device through a module or interface which operates in the device 100.

In operation S820, the device 100 may confirm whether the identification information of the application is obtained. The device 100 may perform the monitoring of the operation S810 when the identification information of the application is not obtained.

In operation S830, when the device 100 receives an input from a user to request additional information of the application corresponding to the identification information, the device 100 may display the additional information of the application on the screen of the device 100.

According to an embodiment of the present inventive concept, the device 100 may display the obtained identification information on the screen of the device 100. The user may confirm the displayed identification information on the screen of the device 100, and then may request the additional information of the application corresponding to the identification information. The addition information may include channel information, information on a source server which transmits the identification information on the application to the device 100, and information on a version of the application.

The device 100 may display the additional information of the application corresponding to the identification information on the screen of the device 100 when receiving the input from the user to request the additional information.

In operation S840, the device 100 may receive an execution request from the user to approve the execution of the application corresponding to the obtained identification information. The user may determine whether to approve the execution of the application by referring to the additional information of the application displayed on the screen of the device 100. When the user approves the execution of the application, the user may transmit the execution request to execute the application to the device 100 by using a user apparatus or a gesture or voice which is pre-set in the device 100.

In operation S850, the device 100 may determine whether the selected identification information exists.

In operation S860, the device may execute the application corresponding to the selected identification information. According to one embodiment of the present inventive concept, the device 100 may execute the application by using middleware associated with the application corresponding to the selected identification information.

In operation S870, the device may terminate implementation of the application when the application corresponding to the selected identification information does not exist.

Figure 9A:
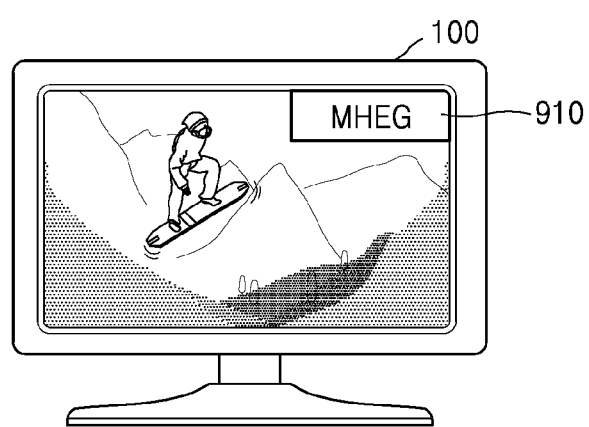
FIGS. 9A and 9B are views illustrating a method of presenting additional information about an application in a device, according to an exemplary embodiment of the present inventive concept.
Figure 9B:
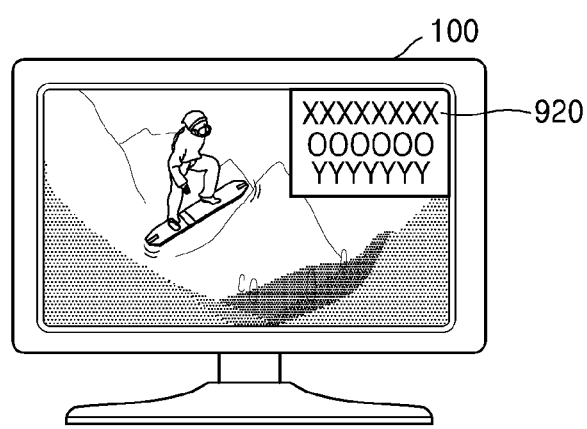

FIGS. 9A and 9B are views illustrating methods of presenting additional information on an application in the device 100 according to an embodiment of the present inventive concept.

Referring to FIG. 9A, when a channel is changed by a user, the device 100 may obtain identification information from a data stream provided in the changed channel. For example, the device 100 may obtain the identification information of an MHEG application.

The device 100 may display a message 910 to confirm an execution of the MHEG application on a screen of the device 100. For example, the device 100 may display an image as the message 910 to confirm the execution of the MHEG application on an upper side of the screen of the device 100. The image 910 displayed on the screen may include a name representing the MHEG application.

Referring to FIG. 9B, a user may request additional information of the MHEG application to the device 100 by using an input apparatus (for example, the input apparatus 730 of FIG. 7) which is able to communicate with the device 100. The device 100 may display a message 920 including the additional information about the application when the device 100 receives an input from the user to request the additional information about the application corresponding to the obtained identification information.

The additional information may include channel information which provides media data to perform rendering using the MHEG application, information on a server which provides the media data to the device 100, and information about a version of the application.

The user may determine the execution of the application by referring to the additional information displayed on the screen of the device 100.

Meanwhile, the device 100 may execute the MHEG application when receiving an execution request from the user. For example, the device may execute the MHEG application by controlling middleware, which controls the MHEG application, among a plurality of middleware which are stored in the device 100.

FIG. 10 is a flowchart illustrating a method of controlling an operation of monitoring identification information on another application when an application is executed in the device 100 according to an embodiment of the present inventive concept.

In operation S1010, the device 100 may determine whether a requested application to be executed exists.

In operation S1020, the device 100 may obtain identification information on at least one application. The device 100 may monitor whether the identification information of the application is obtained when the device 100 determines that the requested application to be executed does not exist.

In operation S1030, the device 100 may display the obtained identification information on a screen of the device 100.

Meanwhile, the operation S1030 of FIG. 10 may correspond to the operation S220 of FIG. 2.

In operation S1040, the device 100 may execute the application when receiving an execution request from the user.

Meanwhile, the operation S1040 of FIG. 10 may correspond to the operation S230 of FIG. 2.

In operation S1050, the device 100 may not perform an operation of monitoring whether the identification information of the application is obtained when an approved application to be executed exists.

When the device 100 continuously obtains the identification information of the application from a data stream, the device re-requests the execution of the already approved application to the use. This causes inconvenience to the user in using the media data. Also, the device 100 may stop the monitoring operation to avoid collision between the already approved application and other application.

Figure 11:
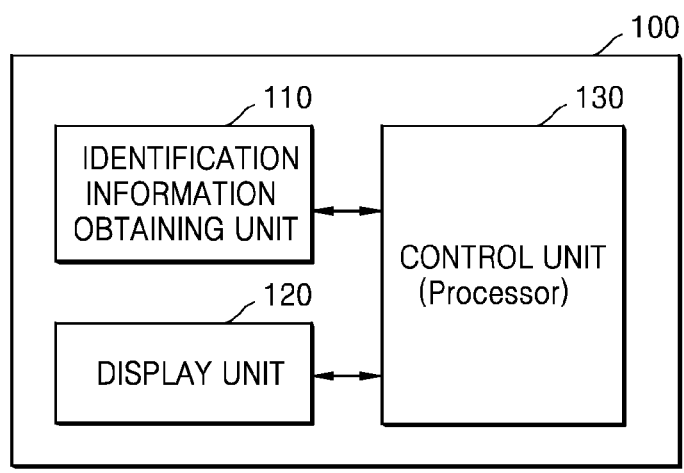
FIG. 11 is a block diagram illustrating a device for controlling implementation of an application, according to an exemplary embodiment of the present inventive concept.

FIG. 11 is a block diagram illustrating the device 100 to control implementation of an application according to an embodiment of the present inventive concept.

As illustrated in FIG. 11, according to an embodiment of the present inventive concept, the device 100 may include an identification information obtaining unit 110, a display unit 120, and a control unit 130. However, all of the above-illustrated units may not be a requisite component. The device 100 may include more than the illustrated units or less than the illustrated units.

The identification information obtaining unit 110 obtains identification information on at least on application to perform rendering media data.

According to one embodiment of the present inventive concept, the identification information obtaining unit 110 may monitor generation of a trigger event to obtain the identification information about the application. For example, when a user changes a channel, which transmits a data stream to the device 100, the trigger event may be generated by receiving a new data stream.

In another example, the identification information obtaining unit 110 may receive an execution command to execute the application from an external server or other device through a module or interface included in the device 100. The identification information obtaining unit 110 may detect the identification information of the application from the received execution command.

The display unit 120 displays the obtained identification information. The identification information about the application may be displayed as an image or text. For example, the display unit 120 may display the identification information using a color of the image which is currently displayed on a side of a screen of the display unit 20 and a color which is distinguishable from the color of the image.

However, the color and text are just an exemplary embodiment. The identification information may be output as audio data through a speaker (not illustrated).

According to one embodiment of the present inventive concept, the device 100 may include an input unit (not illustrated). The input unit may receive an input from the user to request additional information on one application selected from at least one application. Also, when the input unit receives the input from the user to request the additional information, the display unit 120 may display the additional information of the application on the screen of the display unit 120.

The control unit 130 may control the display unit 120 to display the additional information, which the identification information obtaining unit 110 obtains, on the screen of the display unit 120. Also, when the trigger event is generated to obtain identification information on a plurality of applications, the control unit 130 may control the display unit 120 to display the identification information of the respective applications.

The control unit 130 may execute the application when the control unit 130 receives an execution request of the application from the user. According to one embodiment of the present inventive concept, the control unit 130 may execute the application by controlling middleware associated with the application when receiving the execution request of the application.

Meanwhile, when the control unit 130 receives the execution request from the user to approve the execution of the application, the control unit 130 may stop monitoring whether the identification information on the application is obtained until the execution of the approved application is completed. When the control unit 130 completes the execution of the approved application, the control unit 130 may restart the monitoring of whether the identification information on the application is obtained.

Figure 12:
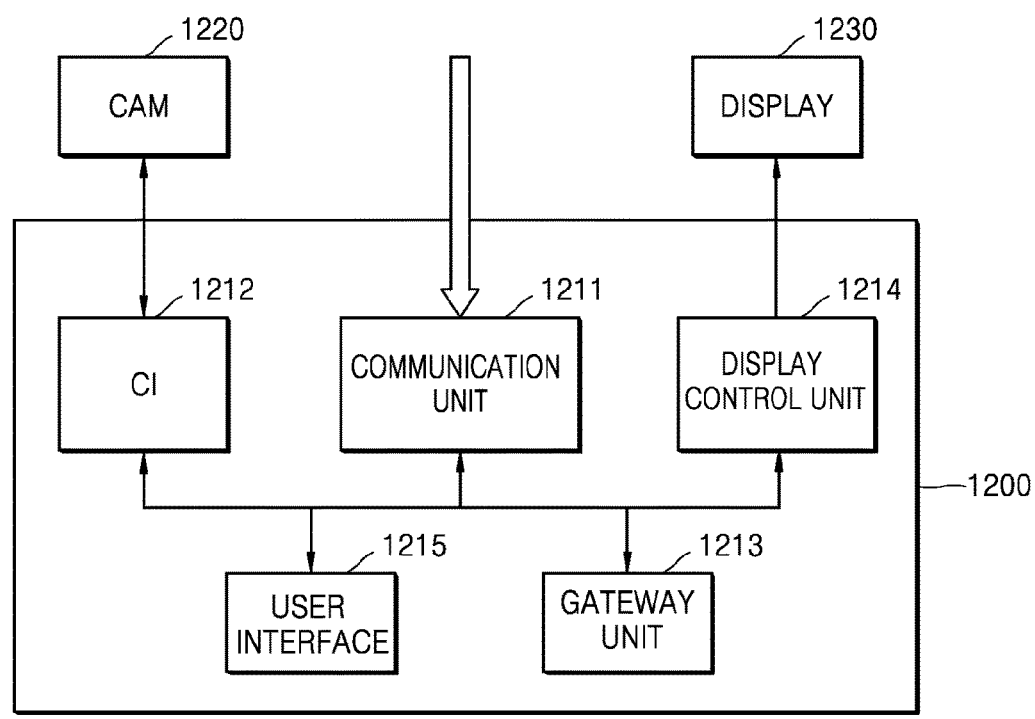
FIG. 12 is a block diagram illustrating a device for controlling implementation of an application in a device, according to another exemplary embodiment of the present inventive concept.

FIG. 12 is a block diagram illustrating a device to control implementation of an application in a device 1200 according to another embodiment of the present inventive concept.

As illustrated in FIG. 12, according to another embodiment of the present inventive concept, the device 1200 may include a communication unit 1211, a common interface (CI) 1212, a gateway 1213, a display control unit 1214, a user interface 1215, a conditional access module (CAM) 1220, and a display 1230. However, all of the above-described units may not be a requisite unit of the device 1200. The device may include more than the above-described units or less than the above-described units.

The communication unit 1211 may receive a data stream including media data from an external server or other device. The received data stream may include a PMT or an AIT.

The CI 1212 may receive an execution command of the application transmitted from the external server or other device through the CAM 1220. The execution command of the application may include identification information of the application. Meanwhile, this is just one embodiment of the present inventive concept. When the device 1200 uses other module which is able to perform the same operation as the CAM 1220, the CI 1212 may be changed to an interface corresponding to the other module.

The gateway 1213 may monitor whether a trigger event is generated. The gateway 1213 may obtain the identification information on at least one the application according to the execution command of the application which is received through the communication unit 1211. The gateway 1213 may be a software command which is stored in a storage medium readable by a computer. The gateway 1213 may stop monitoring whether the identification information is obtained, according to an existence of an approved application.

The gateway 1213 may execute the application by controlling middleware which controls the application corresponding to the execution command among a plurality of middleware which are pre-stored in the device 1200, according to an execution request which is received from a user through the user interface 1215.

When the gateway 1213 continuously obtains the identification information on the already approved application, the gateway 1213 may re-request the execution of the already approved application to the user, and thus the re-requesting causes inconvenience to the user who uses the media data. The gateway 1213 may stop the monitoring operation to avoid collision between the already approve application and other application.

Meanwhile, the gateway 1213 of FIG. 12 may correspond to the identification information obtaining unit 110 and the control unit 130 of FIG. 11.

The display control unit 1214 may control the display 1230 to display the obtained identification information. Also, when the identification information on the plurality of the display control unit 1214 is obtained, the display control unit 1214 may control the display 1230 to display the identification information on the plurality of applications.

The display control unit 1214 may control the display 1230 to display additional information on the application according to a user request.

Meanwhile, the display control unit 1214 and the display 1230 of FIG. 12 may correspond to the display unit 120 of FIG. 11.

When the user approves the execution of the application, the user interface 1215 may receive the execution request of the application from the user. Also, the user interface 1215 may receive a user input to select one of identification information of the plurality of applications. The user interface 1214 may receive the user input to request additional information on the application.

An apparatus according to the present embodiment may include a processor, a memory to store and execute program data, a permanent storage such as a disk drive, and a user interface apparatus such as a communication port to communicate with an external apparatus, a touch panel, a key, a button, etc. A method realized by using a software module or algorism may be stored in a computer-readable storage medium including computer-readable codes or program commands which are executable in the processor. Here, the computer-readable storage medium may include a magnetic storage medium (for example, read-only memory (ROM), random-access memory (RAM), a floppy disk, a hard disk, etc.), an optical data storage medium (for example, a compact disk ROM (CD-ROM), a digital versatile disk (DVD)), etc. The computer-readable storage medium may also be distributed over network coupled computer systems so that the computer-readable codes are stored and executed in a distribution fashion. A medium may be read by the computer, stored in the memory, and executed in the processor.

All documents including published articles, patent applications, letters patents, etc., which are cited in the present disclosure, may be combinable with the present inventive concept according to what the respective documents, alone and in combination in detail, present or what the documents in combination overall, present in the same way as the present disclosure presents overall.

Although the reference characteristics are added in the present embodiments illustrated in the drawings to understand the present inventive concept, and particular terms are used to explain the present embodiments, the particular terms are not intended to limit the scope of the inventive concept and may include all components understandable by those of ordinary skill in the art.

The present inventive concept may include functional blocks and various processes. The functional blocks may be realized by various numbers of hardware and/or software to perform particular functions. For example, the present inventive concept may include a circuit structure, such as a memory, a processor, a logic circuit, a look-up table, etc., to perform various functions by controlling one or more microprocessors or by using other controlling apparatuses. As the components of the present inventive concept may operate by software programming or software components, the present inventive concept may be realized by using script language or programming, such as C, C++, Jaba, and assembler, and by using various algorithms realized by a combination of data structure, processors, routines and other programming components. The functions may be realized by the algorism executable in one or more processors. Also the present inventive concept may adopt conventional art to perform data processing, signal processing, and electronic environmental setting. The terms "mechanism," "element," "means," and "structure" may be used as broad meaning and may not be limited to a mechanic or physical structure. The above terms may include a series of routines of software associated with the processor.

The processing described in the present disclosure is just illustrated as one embodiment, but does not limit the scope of the present inventive concept. For the purpose of brevity, conventional structures, control systems, software, functions of the above systems, etc., may be omitted. Also, connection or connecting elements between the components illustrated in the drawings may be exemplary descriptions of functional, physical, or electrical circuit connection, may be replaceable during implementation of the present inventive concept, and may be represented as various functional connections, physical connections or electrical circuit connections. Also, it there is no statement such as the term "requisite" or "important," the element may not be a requisite element to the present inventive concept.

As used in the claim section of the present disclosure, the term "the" or a similar term to "the" may be intended to include the singular forms and/or the plural forms as well. Also, the term "range" used in the present disclosure may include the respective values included in the range unless the context clearly indicates otherwise, and may be referred to the individual values within the range. Regarding operations or processes of the method of the present disclosure, the operations or processes may be performed in order unless the context clearly indicates otherwise. However, the present disclosure is not limited to the operations and processes to be performed in order. In the present disclosure, the usage of the illustrations or exemplary terms (for example, et cetera or etc.) is just for convenience of explanation, and the scope of the present inventive concept is not limited to the illustrations or exemplary terms unless the claims clearly indicates otherwise.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of controlling implementation of an application in a device, the method comprising:
   obtaining identification information of a plurality of applications performable to render media data, wherein the obtaining of the identification information comprises extracting the identification information from one or more data streams including the media data;
   displaying the obtained identification information on a screen of the device;
   obtaining an additional information request about a selected application from among the plurality of applications;
   displaying additional information about the selected application based on the obtained additional information request, the additional information indicating one among a source server providing the selected application and a channel corresponding to the selected application;
   receiving an execution request of the selected application while the additional information is displayed;
   determining whether the selected application is stored on the device based on the execution request being received while the additional information is displayed; and
   executing the selected application to render the media data based on the determining that the selected application is stored on the device.

2. The method of claim 1, wherein the selected application corresponds to identification information selected by a user from among identification information of a plurality of applications displayed on the screen of the device.

3. The method of claim 1, wherein the obtaining of the identification information comprises extracting the identification information from a program map table (PMT) or an application information table (AIT), which is included in the one or more data streams.

4. The method of claim 1, wherein the one or more data streams comprise data streams each conforming to a corresponding one of broadcasting standards which are different from each other.

5. The method of claim 1, further comprising:
   monitoring whether the identification information of the plurality of applications is obtained.

6. The method of claim 1, wherein the executing of the selected application comprises:
   detecting a gesture of a user; and
   executing the selected application when the detected gesture of the user corresponds to a preset gesture to determine whether the execution of the selected application is approved.

7. The method of claim 1, wherein the obtaining of the identification information comprises obtaining the identification information of the plurality of applications when receiving a request to change a channel through which the media data is received.

8. A non-transitory computer-readable recording medium having recorded thereon computer-readable codes as a program for executing the method of claim 1.

9. A device configured to control implementation of an application, comprising:
at least one processor configured to control the device to obtain identification information of a plurality of applications performable to render media data, wherein the identification information is obtained by extracting the identification information from one or more data streams including the media data;
a display configured to display the obtained identification information on a screen of the display; and
an input interface configured to receive an additional information request indicating a selected application from among the plurality of applications, and an application execution request,
wherein the at least one processor is further configured to control the display to display additional information about the selected application based on the additional information request, determine whether the selected application is stored on the device based on the application execution request being received while the additional information is displayed, and execute the selected application to render the media data based on the at least one processor determining that the selected application is stored on the device, and
wherein the additional information indicates one among a source server providing the selected application and a channel corresponding to the selected application.

10. The device of claim 9, wherein the selected application corresponds to identification information selected by a user from among identification information of a plurality of applications displayed on the screen of the display.

11. The device of claim 9, wherein the at least one processor extracts the identification information from a program map table (PMT) or an application information table (AIT), which is included in the one or more data streams.

12. The device of claim 9, wherein the one or more data streams comprise data streams each conforming to a corresponding one of broadcasting standards that are different from each other.

13. The device of claim 9, wherein the at least one processor monitors whether the identification information of the plurality of applications is obtained.

14. The device of claim 9, wherein the at least one processor detects a gesture of a user and executes the selected application when the detected gesture of the user corresponds to a preset gesture to determine whether execution of the application is approved.

15. The device of claim 9, wherein the at least one processor obtains the identification information of the plurality of applications when receiving a request to change a channel through which the media data is received.

16. The device of claim 9, further comprising a communication interface configured to receive a table of applications,
wherein the at least one processor is further configured to obtain identification information of the plurality of applications from the table of applications.

17. The device of claim 9, wherein the at least one processor is further configured to obtain the identification information of the plurality of applications performable to render the media data.

18. The device of claim 17, wherein the at least one processor is further configured to confirm whether the identification information of the application is obtained based on the additional information request.

19. The device of claim 18, wherein the at least one processor is further configured to determine existence of the identification information of the application based on the application execution request, and execute the selected application based on the application execution request and a determination that the identification information of the application is obtained.

20. The device of claim 19, wherein the at least one processor is further configured to extract the additional information from the one or more data streams including the media data.

* * * * *